US012707399B2

(12) United States Patent
Li et al.

(10) Patent No.: US 12,707,399 B2
(45) Date of Patent: Aug. 11, 2026

(54) POWER CONTROL METHOD FOR UPLINK CONTROL CHANNEL, AND APPARATUS

(71) Applicant: HUAWEI TECHNOLOGIES CO., LTD., Shenzhen (CN)

(72) Inventors: Ruijie Li, Beijing (CN); Lei Guan, Beijing (CN); Shengyu Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 507 days.

(21) Appl. No.: 18/350,449

(22) Filed: Jul. 11, 2023

(65) Prior Publication Data

US 2023/0354209 A1 Nov. 2, 2023

Related U.S. Application Data

(63) Continuation of application No. PCT/CN2021/071620, filed on Jan. 13, 2021.

(51) Int. Cl.
*H04W 52/14* (2009.01)
*H04W 52/32* (2009.01)
*H04W 72/21* (2023.01)

(52) U.S. Cl.
CPC ....... *H04W 52/146* (2013.01); *H04W 52/325* (2013.01); *H04W 72/21* (2023.01)

(58) Field of Classification Search
CPC .. H04W 52/146; H04W 72/21; H04W 52/325
See application file for complete search history.

(56) References Cited

U.S. PATENT DOCUMENTS

2018/0310298 A1 10/2018 Li et al.
2019/0313342 A1* 10/2019 Papasakellariou .. H04W 52/325
2020/0083980 A1 3/2020 Papasakellariou
2021/0282090 A1 9/2021 Zhang et al.

FOREIGN PATENT DOCUMENTS

CN 110166207 A 8/2019
CN 111800240 A 10/2020
WO 2019194655 A1 10/2019

OTHER PUBLICATIONS

3GPP TS 38.213 V15.7.0 (Sep. 2019) 3rd Generation Partnership Project; Technical Specification Group Radio Access Network; NR; Physical layer procedures for control (Release 15) (Year: 2019).*

(Continued)

*Primary Examiner* — Joseph A Bednash
(74) *Attorney, Agent, or Firm* — Leydig, Voit & Mayer, Ltd.

(57) ABSTRACT

This application discloses a power control method for an uplink control channel, and an apparatus. Based on a time-frequency resource of a first physical uplink control channel (PUCCH) for carrying first uplink control information (UCI) and a time-frequency resource of a second PUCCH for carrying second UCI overlapping, a terminal sends the first UCI and the second UCI over a third PUCCH by using first power. The first power is determined based on a quantity of bits of the first UCI and/or a quantity of bits of the second UCI, to improve UCI transmission reliability in this scenario.

20 Claims, 4 Drawing Sheets

(56) References Cited

OTHER PUBLICATIONS

LG Electronics, "Correction on PUCCH and UCI multiplexing for NR," 3GPP TSG RAN WG1 Meeting #94, Gothenburg, Sweden, R1-1808491, Total 7 pages, 3rd Generation Partnership Project, Valbonne, France (Aug. 20-24, 2018).
"3rd Generation Partnership Project; Technical Specification Group Radio Access Network; NR; Physical layer procedures for control (Release 16)," 3GPP TS 38.213 V16.4.0, pp. 1-181, 3rd Generation Partnership Project, Valbonne, France (Dec. 2020).
"3rd Generation Partnership Project; Technical Specification Group Radio Access Network; NR; Multiplexing and channel coding (Release 16)," 3GPP TS 38.212 V16.4.0, pp. 1-152, 3rd Generation Partnership Project, Valbonne, France (Dec. 2020).
ETRI, Intra-UE Multiplexing/Prioritization, 3GPP TSG RAN WG1#103, R1-2009013, 3GPP, Oct. 26-Nov. 13, 2020, total 5 pages.
Qualcomm Incorporated, Intra-UE multiplexing and prioritization for IOT and URLLC, 3GPP TSG RAN WG1#103-e, R1-2009260, 3GPP, Oct. 26-Nov. 13, 2020, total 13 pages.
Potevio, Intra-UE multiplexing for URLLC, 3GPP TSG RAN WG1#102-e, R1-2006870, 3GPP, Aug. 17-28, 2020 (reference for showing well-known technology), total 3 pages.
Samsung, Alignment CR for TS 38.213, 3GPP TSG RAN WG1#103-e, R1-2009742, 3GPP, Nov. 12, 2020 (reference for showing well-known technology), total 172 pages.

* cited by examiner

POWER CONTROL METHOD FOR UPLINK CONTROL CHANNEL, AND APPARATUS

CROSS-REFERENCE TO RELATED APPLICATIONS

This application is a continuation of International Application No. PCT/CN2021/071620, filed on Jan. 13, 2021, the disclosure of which is hereby incorporated by reference in its entirety.

TECHNICAL FIELD

This application relates to the field of wireless communication, and in particular, to a power control method for an uplink control channel, and an apparatus.

BACKGROUND

In a current mobile communication technology, an uplink control channel is used to transmit uplink control information (UCI). For example, the uplink control channel is a physical uplink control channel (PUCCH), and the PUCCH may be used to carry the UCI. The UCI may include at least one of hybrid automatic repeat request (HARQ)-acknowledgement (ACK) information, a scheduling request (SR), or channel state information (CSI). Effective transmission of the UCI is very important for performance of an entire communication system. The HARQ-ACK information is used as an example. Only when HARQ-ACK information sent by a terminal device is correctly transmitted, a network device (for example, an access network device such as a base station) can perform data scheduling by using the correct HARQ-ACK information, to improve data transmission efficiency. The HARQ-ACK information may include an ACK or a negative acknowledgement (NACK).

Power control of the PUCCH is one of means for improving reliability of the PUCCH, and is one of issues studied by researchers in the art. Currently, when resources of a plurality of PUCCHs overlap, a power control solution for the PUCCH is unavailable. Consequently, reliability of the PUCCH is reduced.

SUMMARY

This application provides a power control method for an uplink control channel, and an apparatus, to improve reliability of a PUCCH.

According to a first aspect, an embodiment of this application provides a power control method for an uplink control channel. The method may be performed by a terminal, or may be performed by a component (for example, a chip or a circuit) configured in a terminal. In the following descriptions of this application, an example in which the terminal performs the method is used for description.

The method may include the following steps.

The terminal determines a first uplink control channel for carrying first UCI and a second uplink control channel for carrying second UCI. When a time-frequency resource of the first uplink control channel and a time-frequency resource of the second uplink control channel overlap, the terminal sends the first UCI and the second UCI over a third uplink control channel by using first power.

The first power may be determined according to any one or a combination of any more of the following manners.

Manner 1: The first power may be determined based on a number of bits of the first UCI and/or a number of bits of the second UCI.

Manner 2: The first power is determined based on a first number of bits and/or a second number of bits, the first number of bits is a sum of a number of bits of the first UCI and a number of check bits of the first UCI, and the second number of bits is a sum of a number of bits of the second UCI and a number of check bits of the second UCI.

Manner 3: The first power is determined based on P1 and/or P2, P1 is determined based on a power control parameter of the first uplink control channel, and P2 is determined based on a power control parameter of the second uplink control channel.

Manner 4: The first power is determined based on a bit rate of the first UCI and/or a bit rate of the second UCI.

Manner 5: When a priority of the first UCI is higher than a priority of the second UCI, the first power is determined based on a closed-loop power control parameter of the first uplink control channel.

Manner 6: The first power is determined based on a first closed-loop power control parameter, and the first closed-loop power control parameter is determined based on a closed-loop power control parameter of the first UCI and a closed-loop power control parameter of the second UCI.

According to the foregoing method, when a resource of a first PUCCH and a resource of a second PUCCH overlap, the terminal can send, over a third PUCCH by using first power, information separately carried by the first PUCCH and the second PUCCH. A manner of determining the first power includes any one or a combination of any more of the foregoing manners 1 to 6. This can improve communication reliability in a scenario in which resources of PUCCHs overlap.

In a possible design, the first power is determined based on a number of symbols occupied by the third uplink control channel, a format of the third uplink control channel, the number of bits of the first UCI, and the number of bits of the second UCI.

In a possible design, a sum of the number of bits of the first UCI and the number of bits of the second UCI is less than or equal to 4.

In a possible design, when the bit rate of the first UCI is lower than the bit rate of the second UCI, the first power is determined based on the number of bits of the second UCI and a size of a time-frequency resource for carrying the second UCI, or the first power is determined based on the bit rate of the second UCI.

In a possible design, the first power is determined based on the number of bits of the first UCI and the number of bits of the second UCI, and a sum of the number of bits of the first UCI and the number of bits of the second UCI is greater than or equal to 4 and less than or equal to 11.

In a possible design, the first power is determined based on the first number of bits and the second number of bits, and a sum of the number of bits of the first UCI and the number of bits of the second UCI is greater than 11.

In a possible design, the first power is determined according to the following formula:

$$P=a*P1+b*P2.$$

a and b are constants, a and b are determined based on the number of bits of the first UCI and the number of bits of the second UCI, or a and b are determined based on the bit rate of the first UCI and the bit rate of the second UCI.

In a possible design, the first power is a larger value between P1 and P2.

In a possible design, when the priority of the first UCI is higher than the priority of the second UCI, the first power is determined based on P1.

This design can ensure transmission reliability of UCI with a higher priority between the first UCI and the second UCI.

In a possible design, when the priority of the first UCI is higher than the priority of the second UCI, the first power is determined based on the bit rate of the first UCI and/or a size of a time-frequency resource for carrying the first UCI.

This design can ensure transmission reliability of UCI with a higher priority between the first UCI and the second UCI.

In a possible design, the first closed-loop power control parameter is a larger value between the closed-loop power control parameter of the first uplink control channel and a closed-loop power control parameter of the second uplink control channel.

In a possible design, the bit rate of the first UCI is a bit rate of the first UCI on the third uplink control channel or a bit rate of the first UCI on the first uplink control channel; and the bit rate of the second UCI is a bit rate of the second UCI on the third uplink control channel or a bit rate of the second UCI on the second uplink control channel.

According to this design, if the bit rate of the first UCI is the bit rate of the first UCI on the third uplink control channel, and the bit rate of the second UCI is the bit rate of the second UCI on the third uplink control channel, the bit rates of the first UCI and the second UCI do not need to be re-determined based on the third uplink control channel for calculating the first power, to reduce calculation complexity. If the bit rate of the first UCI is the bit rate of the first UCI on the first uplink control channel, and/or the bit rate of the second UCI is the bit rate of the second UCI on the second uplink control channel, transmission reliability of the first UCI and the second UCI can be further improved.

In a possible design, the first UCI includes HARQ-ACK feedback information and/or a scheduling request, and the second UCI includes HARQ-ACK feedback information and/or a scheduling request.

According to a second aspect, an embodiment of this application provides a power control method for an uplink control channel. The method may be performed by a base station, or may be performed by a component (for example, a chip or a circuit) configured in a base station. In the following descriptions of this application, an example in which the base station performs the method is used for description.

The method may include the following steps.

The base station determines a first uplink control channel for carrying first UCI and a second uplink control channel for carrying second UCI. When a time-frequency resource of the first uplink control channel and a time-frequency resource of the second uplink control channel overlap, the base station receives the first UCI and the second UCI from a terminal over a third uplink control channel. Transmit power of the third uplink control channel is first power.

In the second aspect, for the first power, refer to the description of the first power in any one of the first aspect or the possible designs of the first aspect.

For beneficial effects of the second aspect, refer to the beneficial effects of any one of the first aspect or the possible designs of the first aspect.

According to a third aspect, an embodiment of this application provides a communication apparatus. The apparatus has a function of implementing the terminal in any one of the first aspect or the possible designs of the first aspect. The apparatus may be a terminal, or may be a chip included in a terminal.

The apparatus may also have a function of implementing the base station in any one of the second aspect or the possible designs of the second aspect. The apparatus may be a base station, or may be a chip included in a base station.

The function of the foregoing apparatus may be implemented by hardware, or may be implemented by hardware executing corresponding software. The hardware or the software includes one or more modules or units corresponding to the foregoing function.

In a possible design, a structure of the apparatus includes a processing unit and a transceiver unit. The processing unit is configured to support the apparatus in performing a corresponding function of the terminal in any one of the first aspect or the designs of the first aspect, or performing a corresponding function of the base station in any one of the second aspect or the designs of the second aspect, for example, configured to determine the first uplink control channel for carrying the first UCI and the second uplink control channel for carrying the second UCI. The transceiver unit is configured to support communication between the apparatus and another communication device. For example, when the apparatus is the terminal, the transceiver unit may send the first UCI and the second UCI over the third uplink control channel by using the first power. When the apparatus is the base station, the transceiver unit may be configured to receive the first UCI and the second UCI that are sent over the third uplink control channel. The communication apparatus may further include a storage unit. The storage unit is coupled to the processing unit, and stores program instructions and data that are necessary for the apparatus. In an example, the processing unit may be a processor, the transceiver unit may be a transceiver, and the storage unit may be a memory. The memory may be integrated with the processor, or may be disposed separately from the processor.

In another possible design, a structure of the apparatus includes a processor, and may further include a memory. The processor is coupled to the memory, and may be configured to execute computer program instructions stored in the memory, so that the apparatus performs the method according to any one of the first aspect or the possible designs of the first aspect, or performs the method according to any one of the second aspect or the possible designs of the second aspect. For example, the processor is configured to determine the first uplink control channel for carrying the first UCI and the second uplink control channel for carrying the second UCI. Optionally, the apparatus further includes a communication interface, and the processor is coupled to the communication interface. When the apparatus is a base station or a terminal, the communication interface may be a transceiver or an input/output interface. For example, the communication interface may be configured to send the first UCI and the second UCI over the third uplink control channel by using the first power. When the apparatus is a chip included in the base station or a chip included in the terminal, the communication interface may be an input/output interface of the chip. For example, the communication interface may be configured to receive the first UCI and the second UCI that are sent over the third uplink control channel. Optionally, the transceiver may be a transceiver circuit, and the input/output interface may be an input/output circuit.

Optionally, there may be one or more processors in the communication apparatus, and the processor may be implemented by hardware or software. When the processor is implemented by the hardware, the processor may be a logic circuit, an integrated circuit, or the like. When the processor is implemented by the software, the processor may be a general-purpose processor, and is implemented by reading software code stored in a memory.

Optionally, there may be one or more memories in the communication apparatus. The memory may be integrated with a processor, or may be separated from a processor. For example, the memory may be a non-transitory memory, for example, a read-only memory (ROM). The memory and the processor may be integrated on a same chip, or may be separately disposed on different chips.

According to a fourth aspect, an embodiment of this application provides a computer-readable storage medium. The computer-readable storage medium stores a computer program or instructions, and when the computer program or the instructions are executed by a communication apparatus, the communication apparatus can perform the method according to any one of the first aspect or the possible designs of the first aspect, or perform the method according to any one of the second aspect or the possible designs of the second aspect.

According to a fifth aspect, an embodiment of this application provides a computer program product including a computer program. When a communication apparatus executes the computer program, the communication apparatus can perform the method according to any one of the first aspect or the possible designs of the first aspect, or perform the method according to any one of the second aspect or the possible designs of the second aspect.

According to a sixth aspect, an embodiment of this application provides a communication system. The communication system includes a communication apparatus configured to implement any one of the first aspect or the possible designs of the first aspect and a communication apparatus configured to implement any one of the second aspect or the possible designs of the second aspect.

DESCRIPTION OF EMBODIMENTS

Figure 1:
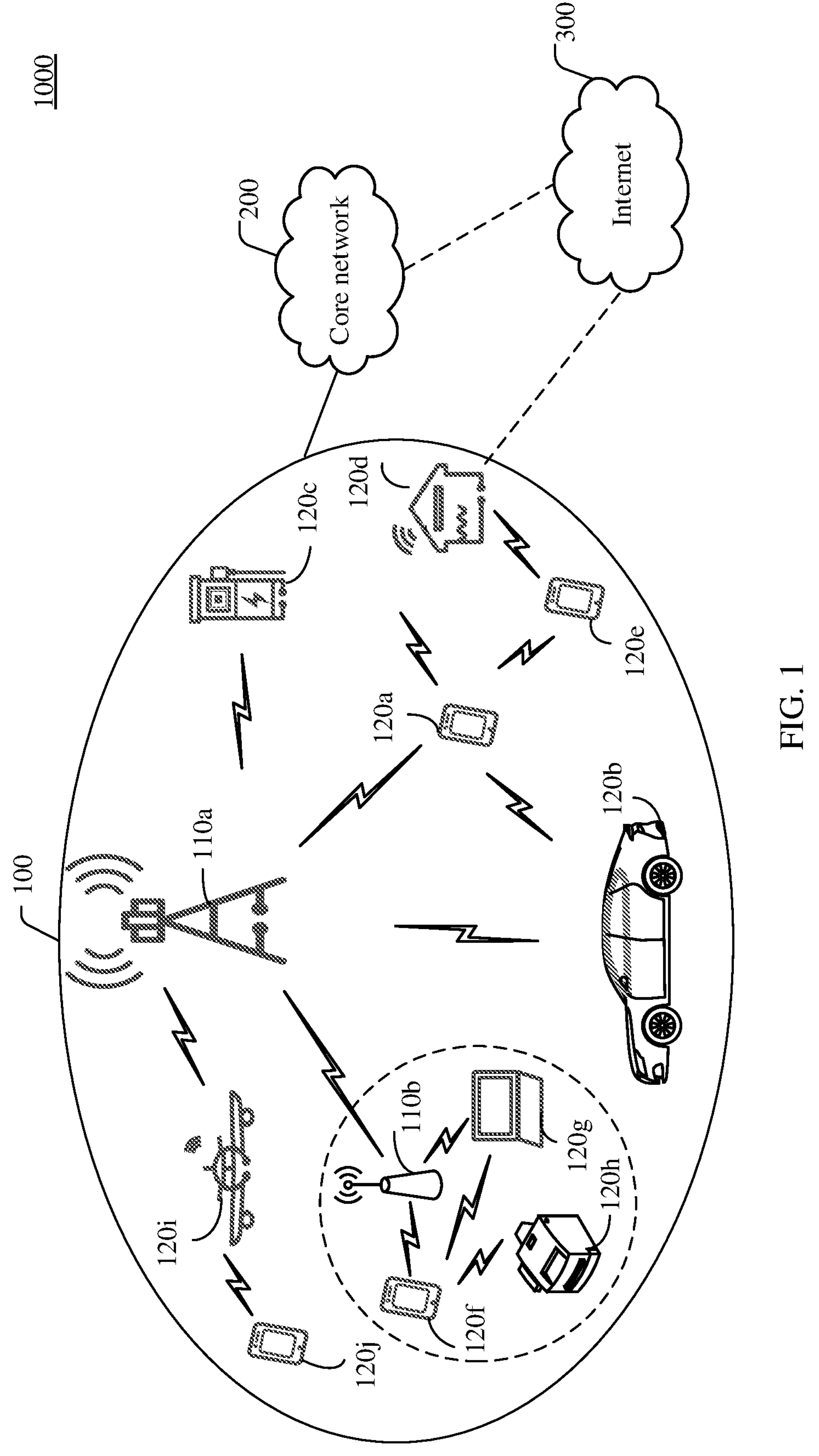
FIG. 1 is a schematic diagram of an architecture of a wireless communication system according to an embodiment of this application.

The following further describes in detail this application with reference to accompanying drawings. A specific operation method in a method embodiment may also be applied to an apparatus embodiment or a system embodiment.

Concepts and technical terms that may be used in this application are first described.

UCI is control information that is sent by a terminal to a network device and that is used to support uplink and downlink data transmission between the terminal and the network device. As described above, the UCI may include at least one of HARQ-ACK information, a scheduling request, or CSI.

An uplink control channel is a channel for transmitting UCI. The uplink control channel in this application may be a PUCCH in a 5th generation (5G) mobile communication system, or may be an uplink control channel in another communication system, for example, an uplink control channel in a 6th generation (6G) mobile communication system. A specific name of the uplink control channel is not limited in this application.

In this application, a time-frequency resource, or a resource for short, is mainly a resource for carrying an uplink control channel, namely, a resource of a PUCCH. A minimum resource granularity in time domain is one time domain symbol, and a minimum resource granularity in frequency domain is one subcarrier. The time domain symbol may be an orthogonal frequency division multiplexing (OFDM) symbol, or may be a discrete Fourier transform-spread-OFDM (DFT-s-OFDM) symbol. Unless otherwise specified, symbols in embodiments of this application are all time domain symbols. A resource element that occupies one symbol in time domain and one subcarrier in frequency domain is referred to as a resource element (RE). In this application, a number of REs occupied by the PUCCH is referred to as a size of a time-frequency resource of the PUCCH or the UCI, or a number of REs occupied by the UCI on the PUCCH is referred to as a size of a time-frequency resource of the PUCCH or the UCI.

Currently, supported PUCCH formats include a format 0, a format 1, a format 2, a format 3, and a format 4. A number of symbols occupied by PUCCHs in the format 0 and the format 2 is less than or equal to 2. A number of symbols occupied by PUCCHs in the format 1, the format 3, and the format 4 is 4 to 14. A specific PUCCH format used by a terminal is indicated by a network device by using signaling. PUCCHs in the format 0 and the format 1 use sequences to carry information, that is, no encoding is performed, and carried information is less than or equal to 2 bits. Information carried on PUCCHs in the format 2, the format 3, and the format 4 is modulated and encoded, and a number of bits of carried information is greater than 2. The modulation and encoding processing herein specifically refers to encoding and modulating information bits carried by the PUCCH, and then carrying the information bits on time-frequency resources for transmission.

Power of a PUCCH is transmit power used for sending the PUCCH.

A priority of a PUCCH, or referred to as a priority corresponding to a PUCCH, refers to a priority of a service corresponding to the PUCCH, or a priority of information carried on the PUCCH. For example, when the PUCCH carries UCI, the priority of the PUCCH is a priority of the UCI. In this application, the priority of the PUCCH and the priority of the UCI may be replaced with each other. A service with a higher priority or UCI with a higher priority has a higher reliability requirement for the PUCCH. The priority of the service is used as an example, priorities of the PUCCH includes a high priority and a low priority. An extremely-high-reliability and extremely-low-latency scenario (URLLC) service may be corresponding to the high priority, and an enhanced mobile broadband (eMBB) service corresponds to the low priority.

For the format 2, the format 3, and the format 4, a bit rate of UCI is related to a number of bits of the UCI, a number of REs occupied by a PUCCH carrying the UCI, and a used modulation order. The number of bits of the UCI may be a sum of quantities of bits of HARQ-ACK information, a scheduling request, channel state information, and the like in the UCI. For example, the bit rate of the UCI, the number of bits of the UCI, the number of REs occupied by the PUCCH, and the modulation order meet: X=R*Qm*Y. X indicates the number of bits of the UCI, Y indicates the number of REs occupied by the PUCCH, R indicates the bit rate of the UCI, and Qm indicates the modulation order. Alternatively, X=R*Qm*Y*L, where L indicates a number of layers for spatial multiplexing transmission when the UCI is transmitted.

For the format 0 and the format 1, a bit rate of UCI is equivalent bit rate. For the format 0, the equivalent bit rate of the UCI is X/Z*A1, where X is a number of bits of UCI, and Z is a number of REs occupied by the UCI. For example, if the PUCCH occupies 10 REs in total, and five REs are for carrying a demodulation reference signal (DMRS), Z=5 instead of 10. A1 may be a value predefined in a protocol, or a value notified by a network device. Optionally, A1=1, or A1 is set to another value, for example, ½. For the format 1, the equivalent bit rate of the UCI is X/Z*A2, where A2 may be a value predefined in a protocol, or a value notified by a network device. Optionally, if X=1, A2=1; or if X=2, A2=½.

FIG. 1 is a schematic diagram of an architecture of a communication system 1000 to which embodiments of this application are applied. As shown in FIG. 1, the communication system includes a radio access network 100 and a core network 200. Optionally, the communication system 1000 may further include the internet 300. The radio access network 100 may include at least one radio access network device (for example, 110*a* and 110*b* in FIG. 1), and may further include at least one terminal (for example, 120*a* to 120*j* in FIG. 1). The terminal is connected to the radio access network device in a wireless manner, and the radio access network device is connected to the core network in a wireless or wired manner. A core network device and the radio access network device may be independent and different physical devices, functions of a core network device and logical functions of the radio access network device are integrated into a same physical device, or a part of functions of a core network device and a part of functions of the radio access network device are integrated into one physical device. A wired or wireless manner may be used for connection between terminals and between radio access network devices. FIG. 1 is merely a schematic diagram. The communication system may further include other network devices, for example, may further include a wireless relay device and a wireless backhaul device, which are not drawn in FIG. 1.

The radio access network device may be a base station, an evolved NodeB (eNodeB), a transmission reception point (TRP), a next generation NodeB (gNB) in a 5th generation (5G) mobile communication system, a next generation NodeB in a 6th generation (6G) mobile communication system, a base station in a future mobile communication system, an access node in a Wi-Fi system, or the like, or may alternatively be a module or unit that completes some functions of a base station, for example, a central unit (CU), or a distributed unit (DU). The radio access network device may be a macro base station (for example, 110*a* in FIG. 1), may be a micro base station or an indoor base station (for example, 110*b* in FIG. 1), or may be a relay node, a donor node, or the like. A specific technology and a specific device form that are used by the radio access network device are not limited in embodiments of this application. For ease of description, the following uses an example in which a base station is used as a radio access network device for description.

The terminal may also be referred to as a terminal device, user equipment (UE), a mobile station, a mobile terminal, or the like. The terminal may be widely applied to various scenarios, for example, device-to-device (D2D), vehicle-to-everything (V2X) communication, machine type communication (MTC), an internet of things (IoT), virtual reality, augmented reality, industrial control, autonomous driving, telemedicine, a smart grid, smart furniture, a smart office, a smart wearable, smart transportation, and a smart city. The terminal may be a mobile phone, a tablet computer, a computer with a wireless transceiver function, a wearable device, a vehicle, an uncrewed aerial vehicle, a helicopter, an airplane, a ship, a robot, a robotic arm, a smart home device, or the like. A specific technology and a specific device form that are used by the terminal are not limited in embodiments of this application.

The base station and the terminal may be at fixed locations, or may be mobile. The base station and the terminal may be deployed on land, including an indoor or outdoor device, a handheld device, or a vehicle-mounted device, may be deployed on a water surface, or may be deployed on an airplane, a balloon, or an artificial satellite in the air. Application scenarios of the base station and the terminal are not limited in embodiments of this application.

Roles of the base station and the terminal may be relative. For example, a helicopter or an uncrewed aerial vehicle 120*i* in FIG. 1 may be configured as a mobile base station. For a terminal 120*j* that accesses the radio access network 100 by using 120*i*, the terminal 120*i* is a base station. However, for the base station 110*a*, 120*i* is a terminal, that is, 110*a* and 120*i* communicate with each other by using a radio air interface protocol. Certainly, 110*a* and 120*i* may also communicate with each other by using an interface protocol between the base station and the base station. In this case, relative to 110*a*, 120*i* is also a base station. Therefore, both the base station and the terminal may be collectively referred to as communication apparatuses. 110*a* and 110*b* in FIG. 1 may be referred to as communication apparatuses having a function of a base station, and 120*a* to 120*j* in FIG. 1 may be referred to as communication apparatuses having a function of a terminal.

Communication may be performed between base stations and terminals, between base stations, and between terminals by using a licensed spectrum, may be performed by using an unlicensed spectrum, or may be performed by using both a licensed spectrum and an unlicensed spectrum. Communication may be performed by using a spectrum below 6 gigahertz (GHz), may be performed by using a spectrum above 6 GHz, or may be performed by using both a spectrum below 6 GHz and a spectrum above 6 GHz. A spectrum resource used for wireless communication is not limited in embodiments of this application.

In embodiments of this application, a function of the base station may be performed by a module (such as a chip) in the base station, or may be performed by a control subsystem including the function of the base station. The control subsystem including the function of the base station herein may be a control center in the foregoing application scenarios such as the smart grid, industrial control, intelligent transportation, and the smart city. A function of the terminal may be performed by a module (such as a chip or a modem) in the terminal, or may be performed by an apparatus including the function of the terminal.

It should be understood that communication between the base station and the terminal may be performed through an air interface. For example, an air interface message such as a radio resource control (RRC) message is transmitted between the terminal and the base station through an air interface. The base station sends a downlink signal or downlink information to the terminal, where the downlink information is carried on a downlink channel. The terminal sends an uplink signal or uplink information to the base station, where the uplink information is carried on an uplink channel.

An example in which an uplink control channel is a PUCCH is used below to describe a data transmission process performed between a base station and a terminal through an air interface.

The base station first sends a piece of downlink data. After receiving the downlink data, the terminal decodes the received downlink data. If finding that the received downlink data fails to be decoded, the terminal sends a NACK to the base station through the PUCCH. If the base station correctly receives the NACK, the base station may schedule for retransmission, and send the downlink data again. This can effectively improve transmission performance of the downlink data. However, if the NACK sent by the terminal is incorrectly received by the base station, that is, the base station decodes the NACK as an ACK, that is, the base station considers that the downlink data transmitted for the first time is successfully decoded by the terminal, the base station does not perform HARQ retransmission on the downlink data. This reduces transmission performance of the downlink data.

It can be learned that transmission reliability of UCI is very important for transmission reliability of an entire communication system.

An important factor that affects transmission reliability of UCI on the PUCCH is power of the PUCCH. If the power of the PUCCH is excessively high or excessively low, the base station may fail to receive the UCI carried on the PUCCH, resulting in a UCI receiving failure. Specifically, transmit power of the PUCCH has important impact on a signal-to-noise ratio of the PUCCH on a receive side. For example, if the transmit power of the PUCCH is excessively low, the signal-to-noise ratio may be excessively low when the base station receives the PUCCH, and further, the UCI carried on the PUCCH is incorrectly decoded. Similarly, if the transmit power of the PUCCH is excessively high, in one aspect, energy waste of the terminal is caused, and in another aspect, interference of the terminal to another device is increased.

For example, currently, the power of the PUCCH meets Formula 1:

$$P_{PUCCH,b,f,c}(i, q_u, q_d, l) = \min\left\{P_{CMAX,f,c}(i),\ P_{O_{PUCCH,b,f,c}(q_u)} + \log_{10}\left(2^{\mu} M_{RB,b,f,c}^{PUCCH}(i)\right) + PL_{b,f,c}(q_d) + \Delta_{F\_PUCCH}(F) + \Delta_{TF,b,f,c}(i) + g_{b,f,c}(i)\right\}. \quad \text{(Formula 1)}$$

$P_{CMAX,f,c}(i)$ indicates maximum power that can be sent by the terminal, and z=min(x,y) indicates that z is equal to a smaller value between x and y. For example, if x=1 and y=2, min (1,2)=1. $P_{O\_PUCCH,b,f,c}(q_u)=P_{O\_NOMINAL\_PUCCH}+P_{O\_UE\_PUCCH}(q_u)$. $P_{O\_NOMINAL\_PUCCH}$ may be a value configured by the base station by using higher layer signaling p0-nominal. If the base station does not configure this item, this item is 0 by default, and $P_{O\_UE\_PUCCH}(q_u)$ is related to spatial relation information (SRI) of the PUCCH. In other words, if the SRI of the PUCCH is determined, a value of $P_{O\_UE\_PUCCH}(q_u)$ can be determined.

$$M_{RB,b,f,c}^{PUCCH}(i)$$

is a number of resource blocks (RBs) allocated for the PUCCH. μ indicates a subcarrier spacing used by the PUCCH. For example, μ=0 indicates that the subcarrier spacing used by the PUCCH is 15 kilohertz (kHz), and μ=1 indicates that the subcarrier spacing used by the PUCCH is 30 kHz. $PL_{b,f,c}(q_d)$ is a variable related to the SRI. It can be determined based on the SRI that, $\Delta_{F\_PUCCH}(F)$ is a value semi-statically configured by using a higher-layer parameter. $\Delta_{TF,b,f,c}(i)$ is a parameter obtained based on a resource occupied by the PUCCH and a number of information bits carried by the PUCCH.

$\Delta_{TF,b,f,c}(i)$ is determined in the following manner A and manner B.

Manner A: For the format 0 and the format 1, $\Delta_{TF,b,f,c}(i)$ is determined based on a number of symbols actually occupied by (or actually allocated to) the PUCCH and a number of carried information bits.

Specifically, $\Delta_{TF,b,f,c}(i)$ meets Formula 2:

$$\Delta_{TF,b,f,c}(i) = 10\log_{10}\left(\frac{N_{ref}^{PUCCH}}{N_{symb}^{PUCCH}(i)}\right) + \Delta_{UCI}(i). \quad \text{(Formula 2)}$$

$$N_{symb}^{PUCCH}(i)$$

indicates a number of the symbols actually occupied by the PUCCH. For the format 0, $$N_{ref}^{PUCCH} = 2,$$

and $\Delta_{UCI}(i)$=. For the format 1, $$N_{ref}^{PUCCH}$$

indicates the number of symbols in one slot. Generally, the value is 14. $\Delta_{UCI}(i)=10\log_{10}(O_{UCI}(i))$, where $O_{UCI}(i)$ indicates a number of bits of information carried on the PUCCH.

Manner B: For the format 2, the format 3, and the format 4, $\Delta_{TF,b,f,c}(i)$ is determined based on the total number of bits of the PUCCH and the number of REs. The total number of bits of the PUCCH may be understood as a sum of a number of information bits carried by the PUCCH and a number of check bits. If the number of check bits is 0, the total number of bits of the PUCCH is equal to the number of information bits carried by the PUCCH. When the number of information bits carried by the PUCCH is less than or equal to a threshold, the number of check bits is 0. The threshold is, for example, 11 bits.

Specifically, if the total number of bits of the PUCCH is less than or equal to 11 bits, $\Delta_{TF,b,f,c}(i)$ meets Formula 3:

$$\Delta_{TF,b,f,c}(i)=10\log_{10}(K_1\cdot(n_{HARQ\text{-}ACK}(i)+O_{SR}(i)+O_{CSI}(i))/N_{RE}(i)) \quad \text{(Formula 3).}$$

$K_1=6$, $n_{HARQ\text{-}ACK}(i)$ indicates a number of bits of the ACK/NACK in the UCI, $O_{SR}(i)$ indicates a number of bits of the SR in the UCI, $O_{CSI}(i)$ indicates a number of bits of the CSI in the UCI, and $N_{RE}(i)$ indicates a number of REs obtained by subtracting REs occupied by the DMRS from REs occupied by the PUCCH. For example, if a total number of REs occupied by the PUCCH is 100, and a number of REs occupied by the DMRS is 10, $N_{RE}(i)=90$. $n_{HARQ\text{-}ACK}(i)+O_{SR}(i)+O_{CSI}(i)/N_{RE}(i)$ may be considered as a parameter related to a bit rate of information carried on the PUCCH.

If the total number of bits of the PUCCH is greater than 11 bits, $\Delta_{TF,b,f,c}(i)$ meets Formula 4:

$$\Delta_{TF,b,f,c}(i)=10\log_{10}(2^{K_2\cdot BPRE(i)}-1) \quad \text{(Formula 4).}$$

$K_2=2.4$, $BPRE(i)=(O_{ACK}(i)+O_{SR}(i)+O_{CSI}(i)+O_{CRC}(i))/N_{RE}(i)$, and for meanings of $n_{HARQ\text{-}ACK}(i)$, $O_{SR}(i)$, $O_{CSI}(i)$, and $N_{RE}(i)$, refer to the description in the formula 3. $O_{CRC}(i)$ is a number of check bits of the UCI. BPRE(i) may be considered as a parameter related to a bit rate of information carried on the PUCCH.

In addition, in the formula 1, $g_{b,f,c}(i,l)$ is a value determined based on a closed-loop power control parameter. The closed-loop power control parameter may be represented as $\delta_{PUCCH,b,f,c}(i,l)$. For a definition of $\delta_{PUCCH,b,f,c}(i,l)$ and a process of determining $g_{b,f,c}(i,l)$ based on $\delta_{PUCCH,b,f,c}(i,l)$ refer to section 7.2.1 in the technical specification (TS) 38.213 V16.1.0 of the 3rd generation partnership project (3GPP).

The power of the PUCCH can be determined according to the foregoing formula 1. In this application, a parameter required for calculating the power of the PUCCH, such as $P_{CMAX,f,c}(i)$, $P_{O\_PUCCH,b,f,c}(q_u)$, $$M_{RB,b,f,c}^{PUCCH}(i),$$

$PL_{b,f,c}(q_d)$, $\Delta_{F\_PUCCH}(F)$, $\Delta_{TF,b,f,c}(i)$, ΔTF,b,f,c(i), and $g_{b,f,c}(i,l)$, and a parameter for determining $P_{CMAX,f,c}(i)$, $P_{O\_PUCCH,b,f,c}(q_u)$, $$M_{RB,b,f,c}^{PUCCH}(i),$$

$PL_{b,f,c}(q_d)$, $\Delta_{F\_PUCCH}(F)$, $\Delta_{TF,b,f,c}(i)$, $\Delta_{TF,b,f,c}(i)$, and $g_{b,f,c}(i,l)$, may be referred to as power control parameters of the PUCCH.

Based on the foregoing manner of determining the power of the PUCCH, it can be learned that currently, the power of the PUCCH is determined for a determined PUCCH. For example, in the formula 1, for different UCI or PUCCHs, values of parameters such as $$M_{RB,b,f,c}^{PUCCH}(i)$$

may be different.

Currently, when resources of two PUCCHs overlap, the terminal multiplexes information to be carried by the two PUCCHs together for transmission, or sends only information to be carried by one PUCCH and discards all information carried by the other PUCCH. The resource overlapping herein includes resource overlapping in time domain and/or frequency domain, that is, time domain resources occupied by the two PUCCHs overlap on at least one symbol, and/or frequency domain resources occupied by the two PUCCHs overlap on at least one subcarrier.

Figure 2:
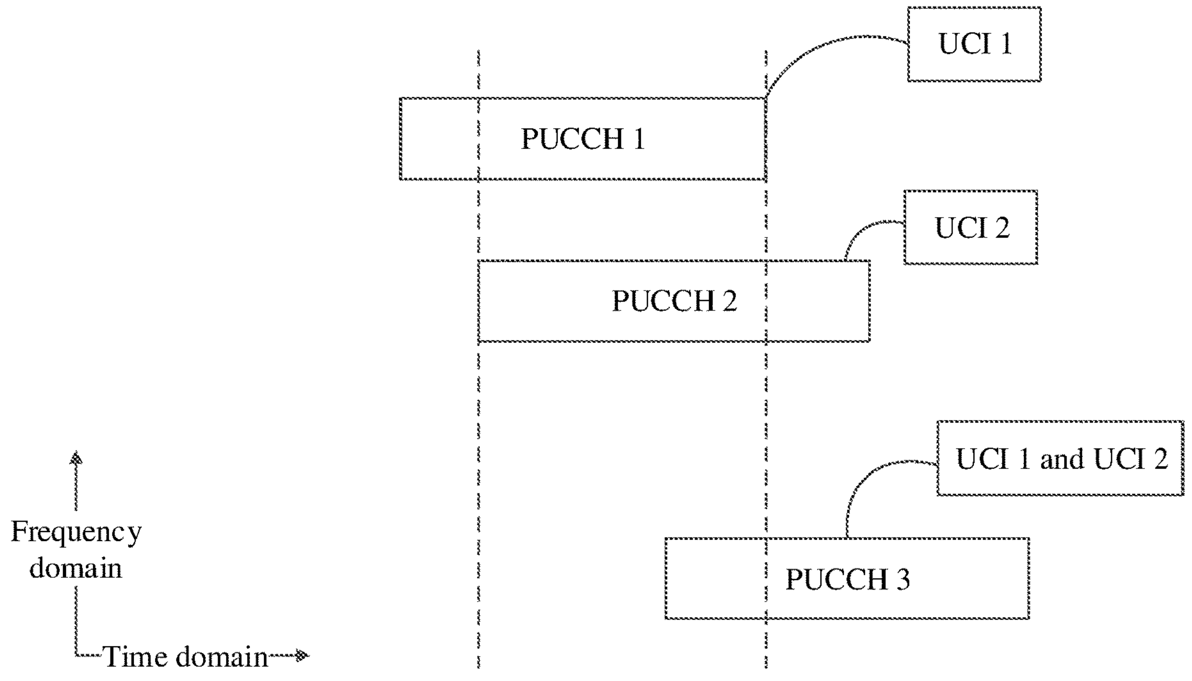
FIG. 2 is a schematic diagram of an overlapping resource according to an embodiment of this application.

For example, as shown in FIG. 2, if resources of a PUCCH 1 and a PUCCH 2 overlap in time domain, the terminal may multiplex UCI 1 to be carried on the PUCCH 1 and UCI 2 to be carried on the PUCCH 2 onto a PUCCH 3 for sending. The PUCCH 3 may be the PUCCH 1 or the PUCCH 2, or may be a PUCCH other than the PUCCH 1 and the PUCCH 2. Optionally, a priority of the PUCCH 1 shown in FIG. 2 is different from a priority of the PUCCH 2.

If the terminal sends the UCI 1 and the UCI 2 over the PUCCH 3, because the PUCCH 3 corresponds to two pieces of UCI, how to determine transmit power of the PUCCH 3 to improve reliability of multiplexing transmission of the two pieces of UCI over the PUCCH is a technical problem to be resolved in embodiments of this application.

In embodiments provided in this application, the base station may be configured to send a physical downlink control channel (PDCCH), or may send downlink control information (DCI) over a PDCCH. The PDCCH or the DCI may indicate the terminal to receive a physical downlink shared channel (PDSCH), or schedule the terminal to send a physical uplink shared channel (PUSCH). The base station may further receive, over the PUCCH, UCI sent by the terminal, or may receive, over the PUSCH, data sent by the terminal. The base station may be further configured to send a channel state information-reference signal (CSI-RS). Correspondingly, the terminal may be configured to receive the PDCCH, the CSI-RS, and the PDSCH that are sent by the base station. The terminal may be further configured to send a channel sounding reference signal (SRS), send the UCI over the PUCCH, or send uplink data over the PUSCH.

In embodiments of this application, the PDSCH, the PDCCH, the PUCCH, and the PUSCH are merely used as examples of a downlink data channel, a downlink control channel, an uplink control channel, and an uplink data channel. In different systems and different scenarios, a data channel and a control channel may have different names. This is not limited in embodiments of this application.

For example, a method provided in embodiments of this application may be implemented by a terminal (or a component such as a chip, a circuit, or a module in a terminal) and a base station (or a component such as a chip, a circuit, or a module in a base station).

Figure 3:
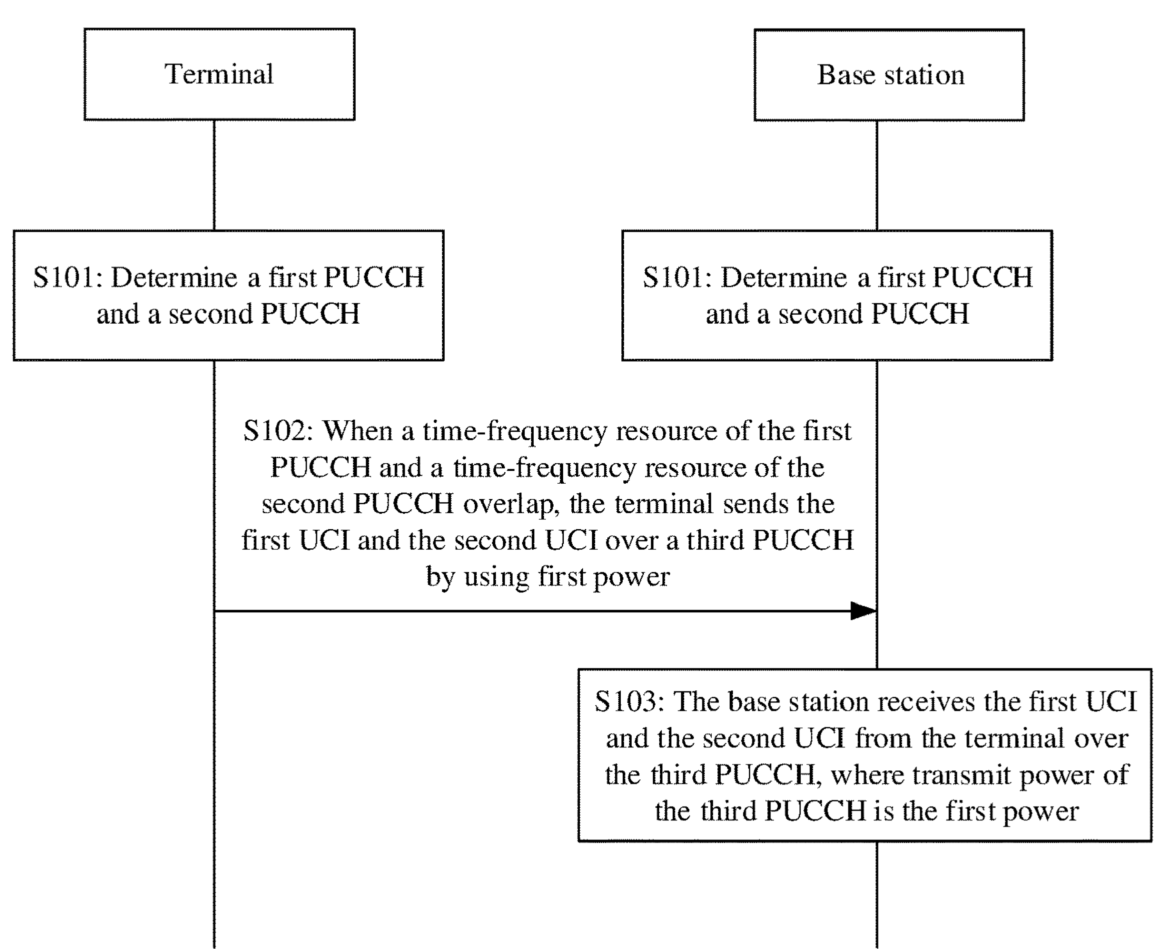
FIG. 3 is a schematic flowchart of a power control method for an uplink control channel according to an embodiment of this application.

As shown in FIG. 3, an embodiment of this application provides a power control method for an uplink control channel.

S101: A terminal and a base station determine a first PUCCH for carrying first UCI and a second PUCCH for carrying second UCI.

A time sequence of determining the first PUCCH and the second PUCCH by the terminal and the base station is not limited in this embodiment of this application. Determining a PUCCH includes determining at least one of a resource of the PUCCH, a power control parameter of the PUCCH, and power of the PUCCH.

Optionally, a priority of the first UCI is different from a priority of the second UCI. In other words, when the priority of the first UCI is different from the priority of the second UCI, the method provided in this embodiment of this application is performed.

FIG. 2 is used as an example. The first PUCCH may correspond to the PUCCH 1, and the second PUCCH may correspond to the PUCCH 2. The first UCI may correspond to the information UCI 1 to be carried by the PUCCH 1, and the second UCI may correspond to the information UCI 2 to be carried by the PUCCH 2.

S102: When a time-frequency resource of the first PUCCH and a time-frequency resource of the second PUCCH overlap, the terminal sends the first UCI and the second UCI over a third PUCCH by using first power. The time-frequency resource overlapping herein means that overlapping exists in time domain and/or frequency domain, and may be partially overlapping or totally overlapping.

S103: When the time-frequency resource of the first PUCCH and the time-frequency resource of the second PUCCH overlap, the base station receives the first UCI and the second UCI from the terminal over the third PUCCH, where transmit power of the third PUCCH is the first power.

The terminal may independently encode the first UCI and the second UCI, and then send encoded bit information to the base station over the third PUCCH.

The first power may be determined in at least one of the following manner 1 to manner 6.

Manner 1: The first power is determined based on a number of bits of the first UCI and/or a number of bits of the second UCI. In other words, the first power is determined according to the formula 1, and at least one parameter in the formula 1 is determined based on the number of bits of the first UCI and/or the number of bits of the second UCI. Specifically, determining based on the number of bits of the first UCI and/or the number of bits of the second UCI includes determining based on the number of bits of the first UCI, determining based on the number of bits of the second UCI, and determining based on the number of bits of the first UCI and the number of bits of the second UCI. For example, the first power or the at least one parameter in the formula 1 is determined based on a larger value between the number of bits of the first UCI and the number of bits of the second UCI, or is determined based on a sum of the number of bits of the first UCI and the number of bits of the second UCI.

Manner 2: The first power is determined based on a first number of bits and/or a second number of bits. In other words, the first power is determined according to the formula 1, and at least one parameter in the formula 1 is determined based on the first number of bits and/or the second number of bits. The first number of bits is a sum of a number of bits of the first UCI and a number of check bits of the first UCI, and the second number of bits is a sum of a number of bits of the second UCI and a number of check bits of the second UCI. Alternatively, the first number of bits is a number of bits of the first UCI, and the second number of bits is a sum of a number of bits of the second UCI and a number of check bits of the second UCI. Alternatively, the first number of bits is a sum of a number of bits of the first UCI and a number of check bits of the first UCI, and the second number of bits is a number of bits of the second UCI. For example, determining based on the first number of bits and/or the second number of bits includes determining based on a larger value between the first number of bits and the second number of bits, determining based on a sum of the first number of bits and the second number of bits, or the like.

Manner 3: The first power is determined based on P1 and/or P2, P1 is determined based on a power control parameter of the first PUCCH, and P2 is determined based on a power control parameter of the second PUCCH. The power control parameter herein is, for example, the PUCCH parameter such as $P_{CMAX,f,c}(i)$, $P_{O\_PUCCH,b,f,c}(q_u)$, $$M_{RB,b,f,c}^{PUCCH}(i),$$

$PL_{b,f,c}(q_d)$, $\Delta_{F\_PUCCH}(F)$, $\Delta_{TF,b,f,c}(i)$, $\Delta_{TF,b,f,c}(i)$, or $g_{b,f,c}(i,l)$ in the formula 1.

Manner 4: The first power is determined based on a bit rate of the first UCI and/or a bit rate of the second UCI. In other words, the first power is determined according to the formula 1, and at least one parameter in the formula 1 is determined based on a bit rate of the first UCI and/or a bit rate of the second UCI.

Manner 5: When the priority of the first UCI is higher than the priority of the second UCI, the first power is determined based on a closed-loop power control parameter of the first PUCCH. In other words, when the priority of the first UCI is higher than the priority of the second UCI, the first power is determined according to the formula 1, and at least one power control parameter in the formula 1 is determined based on the closed-loop power control parameter of the first PUCCH.

Manner 6: The first power is determined based on a first closed-loop power control parameter. For example, the first power is determined according to the formula 1, and at least one parameter in the formula 1 is determined based on the first closed-loop power control parameter. The first closed-loop power control parameter is determined based on a closed-loop power control parameter of the first UCI and a closed-loop power control parameter of the second UCI.

The foregoing method is used, to improve transmission reliability of the third PUCCH, and meet transmission requirements of the UCI 1 and the UCI 2 as much as possible.

Refer to FIG. 2. The following separately describes methods for determining the first power in the manners 1 to 6 by using an example in which the terminal determines the first power.

In the manner 1, when the first power is determined according to the formula 1, at least one of parameters such as $P_{CMAX,f,c}(i)$, $P_{O\_PUCCH,b,f,c}(q_u)$, $$M_{RB,b,f,c}^{PUCCH}(i),$$

$PL_{b,f,c}(q_d)$, $\Delta_{F\_PUCCH}(F)$, $\Delta_{TF,b,f,c}(i)$, $\Delta_{TF,b,f,c}(i)$, or $g_{b,f,c}(i,l)$ in the formula 1 is determined based on the number of bits of the UCI 1 and/or the number of bits of the UCI 2. For example, when the first power is determined according to the formula 1, $\Delta_{TF,b,f,c}(i)$ in the formula 1 is determined based on the number of bits of the UCI 1 and/or the number of bits of the UCI 2; or $\Delta_{TF,b,f,c}(i)$ in the formula 1 is determined according to the formula 2 or formula 3, and a parameter in the formula 2 or formula 3 is related to the number of bits of the UCI 1 and/or the number of bits of the UCI 2.

In an implementation of the manner 1, the first power may be determined based on a number of symbols occupied by the PUCCH 3, a format of the PUCCH 3, and the number of bits of the UCI 1 and/or the number of bits of the UCI 2.

The following describes the implementation of the manner 1 by using an example in which $\Delta_{TF,b,f,c}(i)$ is determined according to the formula 2 and the first power is determined according to the formula 1.

When $\Delta_{TF,b,f,c}(i)$ is determined according to the formula 2, $T_{TF,b,f,c}$ may be determined based on the number of symbols occupied by the PUCCH 3, the format of the PUCCH 3, and the number of bits of the UCI 1 and/or the number of bits of the UCI 2. The format of the PUCCH 3 and the number of symbols occupied by the PUCCH 3 may be configured by the base station.

For example, $$N_{symb}^{PUCCH}(i)$$

in the formula 2 is determined based on the number of symbols occupied by the PUCCH 3, instead of being determined based on a number of symbols occupied by the PUCCH 1 or the PUCCH 2.

For another example, in the formula 2, a value of $$N_{ref}^{PUCCH}$$

is determined based on the format of the PUCCH 3. For example, when the format of the PUCCH 3 is the format 0, $$N_{ref}^{PUCCH} = 2,$$

and $\Delta_{UCI}(i)=0$. When the format of the PUCCH 3 is the format 1, $$N_{ref}^{PUCCH}$$

indicates a number of symbols in one slot, $\Delta_{UCI}(i)=10\log_{10}(O_{UCI}(i))$ and $O_{UCI}(i)$ is determined based on the number of bits of the UCI 1 and/or the number of bits of the UCI 2. In this application, the number of bits of the UCI 1 may be denoted as A, and the number of bits of the UCI 2 may be denoted as B. Optionally, $O_{UCI}(i)=A$, $O_{UCI}(i)=B$, or $O_{UCI}(i)=A+B$.

Optionally, if $A+B\leq 2$, $A+B=3$, or $A+B=4$, the terminal may determine the first power according to the formula 2. For example, the terminal determines $\Delta_{TF,b,f,c}$ according to the formula 2, the number of symbols occupied by the PUCCH 3, the format of the PUCCH 3, and the number of bits of the UCI 1 and/or the number of bits of the UCI 2, and determines the first power based on $\Delta_{TF,b,f,c}(i)$.

Optionally, if A=2, and B=2, the terminal may determine the first power according to the formula 2. For example, the terminal determines $\Delta_{TF,b,f,c}(i)$ according to the formula 2, the number of symbols occupied by the PUCCH 3, the format of the PUCCH 3, and the number of bits of the UCI 1 and/or the number of bits of the UCI 2, and determines the first power based on $\Delta_{TF,b,f,c}(i)$.

The following describes another implementation of the manner 1 by using an example in which $\Delta_{TF,b,f,c}$ is determined according to the formula 3 and the first power is determined according to the formula 1.

Specifically, in the formula 3, $n_{HARQ\text{-}ACK}(i)$ may indicate a sum of a number of bits of the ACK/NACK in the UCI 1 and a number of bits of the ACK/NACK in the UCI 2 (or a larger value between the number of bits of the ACK/NACK in the UCI 1 and the number of bits of the ACK/NACK in the UCI 2), $O_{SR}(i)$ indicates a sum of a number of bits of the SR in the UCI 1 and a number of bits of SR in the UCI 2 (or a larger value between the number of bits of the SR in the UCI 1 and the number of bits of the SR in the UCI 2), $O_{CSI}(i)$ indicates a sum of a number of bits of the CSI in the UCI 1 and a number of bits of the CSI in the UCI 2 (or a larger value between the number of bits of the CSI in the UCI 1 and the number of bits of the CSI in the UCI 2), and $N_{RE}(i)$ indicates a number of REs occupied by the PUCCH 3. Optionally, the number of occupied REs is obtained by subtracting, from the total number of REs occupied by the PUCCH 3, the number of REs occupied by the DMRS.

Optionally, if $5\leq A+B\leq 11$, the first power may be determined according to the formula 3. For example, $\Delta_{TF,b,f,c}(i)$ is determined according to the formula 3, and the first power is determined based on $\Delta_{TF,b,f,c}(i)$.

Optionally, if $4\leq A+B\leq 11$, the first power may be determined according to the formula 3. For example, $\Delta_{TF,b,f,c}(i)$ is determined according to the formula 3, and the first power is determined based on $\Delta_{TF,b,f,c}(i)$.

Optionally, if $3\leq A\leq 11$, and $3\leq B\leq 11$, the first power may be determined according to the formula 3. For example, $\Delta_{TF,b,f,c}(i)$ is determined according to the formula 3, and the first power is determined based on $\Delta_{TF,b,f,c}(i)$.

Optionally, if $3\leq A\leq 11$, or $3\leq B\leq 11$, the first power may be determined according to the formula 3. For example, $\Delta_{TF,b,f,c}(i)$ is determined according to the formula 3, and the first power is determined based on $\Delta_{TF,b,f,c}(i)$.

In the manner 2, when the first power is determined according to the formula 1, at least one of parameters such as $P_{CMAX,f,c}(i)$, $P_{O\_PUCCH,b,f,c}(q_u)$, $$M_{RB,b,f,c}^{PUCCH}(i),$$

$PL_{b,f,c}(q_d)$, $\Delta_{F\_PUCCH}(F)$, $\Delta_{TF,b,f,c}(i)$, $\Delta_{TF,b,f,c}(i)$, or $g_{b,f,c}(i,l)$ in the formula 1 is determined based on the first number of bits and/or the second number of bits.

Optionally, when the first power is determined according to the formula 1, $\Delta_{TF,b,f,c}(i)$ in the formula 1 is determined based on the first number of bits and/or the second number of bits.

For example, the first number of bits is the sum of the number of bits of the UCI 1 and the number of check bits of the UCI 1, and the second number of bits is the sum of the number of bits of the UCI 2 and the number of check bits of the UCI 2. A number of check bits of UCI may be defined in a protocol or be configured by the base station for the terminal by using signaling. When a number of bits of the UCI is less than or equal to 11, the number of check bits of the UCI may be 0. The UCI herein may be the UCI 1 or the UCI 2.

Specifically, $\Delta_{TF,b,f,c}(i)$ in the formula 1 may be determined according to the formula 4, and a parameter related to the formula 4 includes the first number of bits and/or the second number of bits, or includes a parameter determined based on the first number of bits and/or the second number of bits. For example, in the formula 4, a sum of $n_{HARQ\text{-}ACK}$ (i), $O_{SR}(i)$, $O_{CSI}(i)$, and $O_{CRC}(i)$ is equal to the sum of the first number of bits and the second number of bits.

Optionally, if A+B≥11, or A+B>11, the first power is determined based on the first number of bits and/or the second number of bits. Alternatively, if A+B≥12, the first power is determined based on the first number of bits and/or the second number of bits. Alternatively, if A≥11, and/or B≥11, the first power is determined based on the first number of bits and/or the second number of bits. Alternatively, if A≥12, and/or B≥12, the first power is determined based on the first number of bits and/or the second number of bits.

In the manner 3, P1 may be considered as power of the PUCCH 1. P1 may be determined based on a power control parameter corresponding to the PUCCH 1 according to the formula 1 and one or more of the formula 2 to the formula 4. P2 may be considered as power of the PUCCH 2. P2 may be determined based on a power control parameter corresponding to the PUCCH 2 according to the formula 1 and one or more of the formula 2 to the formula 4. The power control parameter herein may include an open-loop power control parameter and/or a closed-loop power control parameter.

In a possible implementation of the manner 3, the first power P may be a larger one between P1 and P2, to improve transmission reliability of the UCI 1 and the UCI 2.

Because P1 and P2 are respectively determined based on the power control parameter corresponding to the PUCCH 1 and the power control parameter corresponding to the PUCCH 2, that is, P1 and P2 respectively adapt to transmission requirements of the UCI 1 and the UCI 2, when independently encoded UCI 1 and the UCI 2 are sent over the PUCCH 3, the transmit power P of the PUCCH 3 is determined based on P1 and P2. This can better meet transmission requirements of the two pieces of UCI.

For example, P may be determined according to Formula 6:

$$P=a*P1+b*P2 \quad \text{(Formula 6).}$$

a and b are constants; a and b are determined based on the number of bits of the UCI 1 and the number of bits of the UCI 2; or a and b are determined based on the bit rate of the UCI 1 and the bit rate of the UCI 2. For example, a:b=A:B, or a:b=R2:R1. In other words, a ratio of a to b is equal to a ratio of A to B, or the ratio of a to b is equal to a ratio of R2 to R1. R1 is the bit rate of the UCI 1, and R2 is the bit rate of the UCI 2.

Specifically, the bit rate of the UCI 2 may be a bit rate determined when the UCI 2 is carried on the PUCCH 2 (namely, the bit rate of the UCI 2 on the PUCCH 2) or a bit rate determined when the UCI 2 is carried on the PUCCH 3 (namely, the bit rate of the UCI 2 on the PUCCH 3). The bit rate of the UCI 1 may be a bit rate determined when the UCI 1 is carried on the PUCCH 1 (namely, the bit rate of the UCI 1 on the PUCCH 1) or a bit rate determined when the UCI 1 is carried on the PUCCH 3 (namely, the bit rate of the UCI 1 on the PUCCH 3).

In another possible implementation of the manner 3, the first power P may be determined based on a priority corresponding to the UCI 1, a priority corresponding to the UCI 2, and one of P1 and P2.

For example, when the priority of the UCI 1 is higher than the priority of the UCI 2, or when the bit rate of the UCI 1 is lower than the bit rate of the UCI 2, the first power is determined based on P1. For example, the first power is P1, or a value obtained by scaling P1.

For example, the first power may be determined according to Formula 7:

$$P=a*P1 \quad \text{(Formula 7).}$$

a is a real number greater than 0. a is defined in a protocol, or is notified to the terminal by using signaling after being determined by the base station.

When P is determined based on P1, the first power may be further determined based on the bit rate of the UCI 1 on the PUCCH 3 and/or a resource that is on the PUCCH 3 and that is for carrying the UCI 1. Specifically, when P1 is determined according to the formula 3, $n_{HARQ\text{-}ACK}(i)+O_{SR}(i)+O_{CSI}(i)/N_{RE}(i)$ is a parameter related to the bit rate of the UCI 1 on the PUCCH 3, or when P1 is determined according to the formula 4, BPRE(i) is a parameter related to the bit rate of the UCI 1 on the PUCCH 3. Alternatively, when P1 is determined according to the formula 3 or formula 4, $N_{RE}(i)$ indicates a number of REs that are on the PUCCH 3 and that are for carrying the UCI 1. For example, the PUCCH 3 occupies 100 REs in total, where 50 REs are for carrying the UCI 1, 30 REs are for carrying the UCI 2, and the DMRS occupies 20 REs. In this case, the number of REs carrying the UCI 1 is 50. In addition, in this example, the number of REs for carrying the UCI 2 is 30.

In this implementation, the first power needs to be re-determined based on the PUCCH 3. Bit rates used and time-frequency resources occupied by the UCI 1 on the PUCCH 1 and the PUCCH 3 may be different. However, in S102, the UCI 1 is sent over the PUCCH 3, and is not sent over the PUCCH 1. Therefore, the first power is calculated based on a bit rate or a time-frequency resource corresponding to the UCI 1 on the PUCCH 3, to better match a channel feature corresponding to a case in which the UCI 1 is actually sent, so as to further improve PUCCH reliability.

In the manner 4, when the first power is determined according to the formula 1, at least one of parameters such as $P_{CMAX,f,c}(i)$, $P_{O\_PUCCH,b,f,c}(q_u)$, $$M_{RB,b,f,c}^{PUCCH}(i),$$

$PL_{b,f,c}(q_d)$, $\Delta_{F\_PUCCH}(F)$, $\Delta_{TF,b,f,c}(i)$, $\Delta_{TF,b,f,c}(i)$, or $g_{b,f,c}(i,l)$ in the formula 1 is determined based on the bit rate of the UCI 1 and/or the bit rate of the UCI 2.

Optionally, the bit rate of the UCI 1 may be a bit rate of the UCI 1 on the PUCCH 1 or a bit rate of the UCI 1 on the PUCCH 3. The bit rate of the UCI 1 on the PUCCH 1 and the bit rate of the UCI 1 on the PUCCH 3 may be the same or different. The bit rate of the UCI 2 may be a bit rate of the UCI 2 on the PUCCH 1 or a bit rate of the UCI 2 on the PUCCH 3.

When the bit rate of the UCI 1 is the bit rate of the UCI 1 on the PUCCH 3, the first power can better match a feature of sending the UCI 1, to improve reliability of the UCI 1. Similarly, when the bit rate of the UCI 2 is the bit rate of the UCI 2 on the PUCCH 3, the first power can better match a feature of sending the UCI 2, to improve reliability of the UCI 2.

In a possible implementation of the manner 4, when the bit rate of the UCI 1 is lower than the bit rate of the UCI 2, or when the priority of the UCI 1 is higher than the priority of the UCI 2, to improve transmission reliability of the UCI 1, the first power may be determined based on the bit rate of the UCI 2, or it may be understood that the first power is determined based on the number of bits of the UCI 2 and a size of a time-frequency resource for carrying the UCI 2, because the bit rate of the UCI 2 may be determined based on the number of bits of the UCI 2 and the size of the time-frequency resource for carrying the UCI 2. The size of the time-frequency resource for carrying the UCI 2 may be a size of a time-frequency resource occupied by the PUCCH 2 or a size of a time-frequency resource for carrying the UCI 2 on the PUCCH 3. Because the bit rate of the UCI 2 is lower than the bit rate of the UCI 1, the first power determined based on the bit rate of the UCI 2 is usually higher than the first power determined based on the bit rate of the UCI 1, to improve transmission reliability of the UCI 1. For example, when the first power is determined according to the formula 1, if $\Delta_{TF,b,f,c}(i)$ in the formula 1 is determined according to the formula 3, $n_{HARQ\text{-}ACK}(t)+O_{SR}(i)+O_{CSI}(i))/N_{RE}(i)$ in the formula 3 may be a parameter related to the bit rate of the UCI 2 on the PUCCH 3; or in the formula 3, $n_{HARQ\text{-}ACK}(i)+O_{SR}(i)+O_{CSI}(i)$ indicates the number of bits of the UCI 2, and $N_{RE}(i)$ indicates a number of REs that are for carrying the UCI 2 and that are on the PUCCH 3.

If $\Delta_{TF,b,f,c}(i)$ in the formula 1 is determined according to the formula 4, BPRE(i) in the formula 4 is a parameter related to the bit rate of the UCI 2 on the PUCCH 3; or BPRE(i) in the formula 4 is determined based on $n_{HARQ\text{-}ACK}(i)+O_{SR}(i)+O_{CSI}(i)$ and $N_{RE}(i)$ where $n_{HARQ\text{-}ACK}(i)+O_{SR}(i)+O_{CSI}(i)$ indicates the number of bits of the UCI 2, and $N_{RE}(i)$ indicates the number of REs that are for carrying the UCI 2 and that are on the PUCCH 3. Explanations of the number of REs carrying the UCI 2 are similar to those of the number of REs carrying the UCI 1. Details are not described again.

Similarly, when the bit rate of the UCI 1 is not higher than (or lower than) the bit rate of the UCI 2, or when the priority of the UCI 1 is higher than (or not lower than) the priority of the UCI 2, the first power may be determined based on the bit rate of the UCI 1, or it may be understood that the first power is determined based on the number of bits of the UCI 1 and a size of a time-frequency resource for carrying the UCI 1. The size of the time-frequency resource for carrying the UCI 1 may be a size of a time-frequency resource occupied by the PUCCH 1 or a size of a time-frequency resource for carrying the UCI 1 on the PUCCH 3. Because the bit rate of the UCI 1 is lower than the bit rate of the UCI 2, the first power determined based on the bit rate of the UCI 1 is usually lower than the first power determined based on the bit rate of the UCI 2, to reduce transmit power of the terminal.

In the manner 5, when the priority of the UCI 1 is higher than the priority of the UCI 1, when the first power is determined according to the formula 1, at least one of parameters such as $P_{CMAX,f,c}(i)$, $P_{O\_PUCCH,b,f,c}(q_u)$, $$M_{RB,b,f,c}^{PUCCH}(i),$$

$PL_{b,f,c}(q_d)$, $\Delta_{F\_PUCCH}(F)$, $\Delta_{TF,b,f,c}(i)$, $\Delta_{TF,b,f,c}(i)$, or $g_{b,f,c}(i,l)$ in the formula 1 is determined based on the closed-loop power control parameter of the PUCCH 1. In other words, the first power is determined based on a closed-loop power control parameter corresponding to a PUCCH with a higher priority between the PUCCH 1 and the PUCCH 2. For example, $g_{b,f,c}(i,l)$ is determined based on the closed-loop power control parameter of the PUCCH 1, that is, $g_{b,f,c}(i,l)$ of the PUCCH 3 is determined based on the closed-loop power control parameter $\delta_{PUCCH,b,f,c}(i,l)$ of the PUCCH 1. For a meaning of $\delta_{PUCCH,b,f,c}(i,l)$ and a manner of determining $\delta_{PUCCH,b,f,c}(i,l)$ refer to section 7.2.1 in 3GPP TS 38.213 V16.1.0.

For example, a priority of the PUCCH 1 is a high priority, and a priority of the PUCCH 2 is a low priority. $g_{b,f,c}(i,l)$ obtained through calculation based on the PUCCH 1 is C, and $g_{b,f,c}(i,l)$ obtained based on the PUCCH 2 is D. In this case, in S102, $g_{b,f,c}(i,l)$ for determining the first power is C, and $g_{b,f,c}(i,l)$ does not need to be recalculated. Recalculation refers to recalculating a closed-loop power control parameter on the PUCCH 3. In other words, when the first power is determined according to the formula 1, $g_{b,f,c}(i,l)$ does not need to be re-determined based on $\delta_{PUCCH,b,f,c}(i,l)$ Because the terminal has determined $g_{b,f,c}(i,l)$ when determining the PUCCH 1 and the PUCCH 2 in S101, the terminal does not need to re-determine $g_{b,f,c}(i,l)$ when determining the PUCCH 3. This can reduce a processing capability of the terminal, reduce processing complexity, and reduce processing overheads.

In the manner 6, that the first power is determined based on the closed-loop power control parameter of the UCI 1 and the closed-loop power control parameter of the UCI 2 includes: The first power is determined based on a larger one between the closed-loop power control parameter of the UCI 1 and the closed-loop power control parameter of the UCI 2, or is determined based on a larger one between a value determined based on the closed-loop power control parameter of the UCI 1 and a value determined based on the closed-loop power control parameter of the UCI 2.

For example, when the first power is determined according to the formula 1, at least one of parameters such as $P_{CMAX,f,c}(i)$, $P_{O\_PUCCH,b,f,c}(q_u)$, $$M_{RB,b,f,c}^{PUCCH}(i),$$

$PL_{b,f,c}(q_d)$, $\Delta_{F\_PUCCH}(F)$, $\Delta_{TF,b,f,c}(i)$, $\Delta_{TF,b,f,c}(i)$ or $g_{b,f,c}(i,l)$ in the formula 1 is determined based on the closed-loop power control parameter of the UCI 1 and the closed-loop power control parameter of the UCI 2. In other words, the first power is determined based on the closed-loop power control parameter of the PUCCH 1 and a closed-loop power control parameter of the PUCCH 2.

For example, when the first power is determined according to the formula 1, $g_{b,f,c}(i,l)$ in the formula 1 may be a larger one between $g_{b,f,c}(i,l)$ determined based on the closed-loop power control parameter of the PUCCH 1 and $g_{b,f,c}(i,l)$ determined based on the closed-loop power control parameter of the PUCCH 2, to ensure reliability of the UCI 1 and the UCI 2 as much as possible.

For another example, when the first power is determined according to the formula 1, $g_{b,f,c}(i,l)$ in the formula 1 may be a value obtained by performing an operation such as averaging or weighted averaging on $g_{b,f,c}(i,l)$ determined based on the closed-loop power control parameter of the PUCCH 1 and $g_{b,f,c}(i,l)$ determined based on the closed-loop power control parameter of the PUCCH 2.

Optionally, in addition to the foregoing descriptions of the power control parameters in the manners 1 to 6, when the first power is determined according to the formula 1, a parameter related to the formula 1 may be a power control parameter of the PUCCH 3.

For example, parameters such as $P_{O\_PUCCH,b,f,c}(q_u)$ and $PL_{b,f,c}(q_d)$ in the formula 1 are determined based on SRI associated with the PUCCH 3.

Optionally, in S102, the terminal sends the first UCI and the second UCI in an independent encoding manner, and correspondingly, the base station receives the first UCI and the second UCI in the independent encoding manner. In other words, when the first UCI and the second UCI are sent over the PUCCH 3 in the independent encoding manner, the method shown in FIG. 3 is performed.

Based on a same concept, an embodiment of this application further provides a communication apparatus, configured to implement functions of the terminal and the base station in the foregoing embodiment.

It may be understood that, to implement the functions in the foregoing embodiment, the base station and the terminal include corresponding hardware structures and/or software modules for performing the functions. A person skilled in the art should easily be aware that, in combination with units and method steps of the examples described in embodiments disclosed in this application, the terminal apparatus provided in this application may be implemented by hardware or a combination of hardware and computer software. Whether a function is performed by hardware or hardware driven by computer software depends on a particular application scenario and design constraint of the technical solutions.

Figure 4:
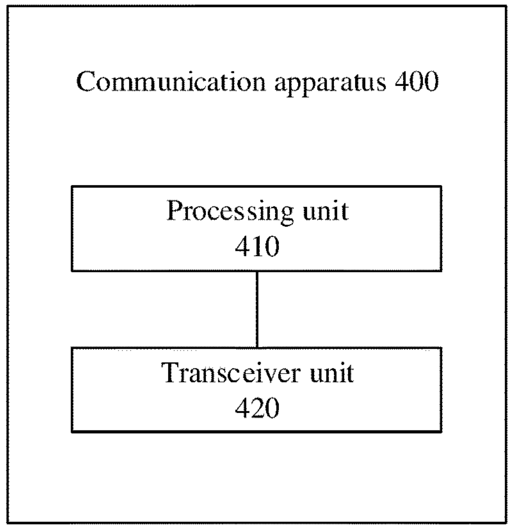
FIG. 4 is a schematic diagram of a structure of a communication apparatus according to an embodiment of this application.
Figure 5:
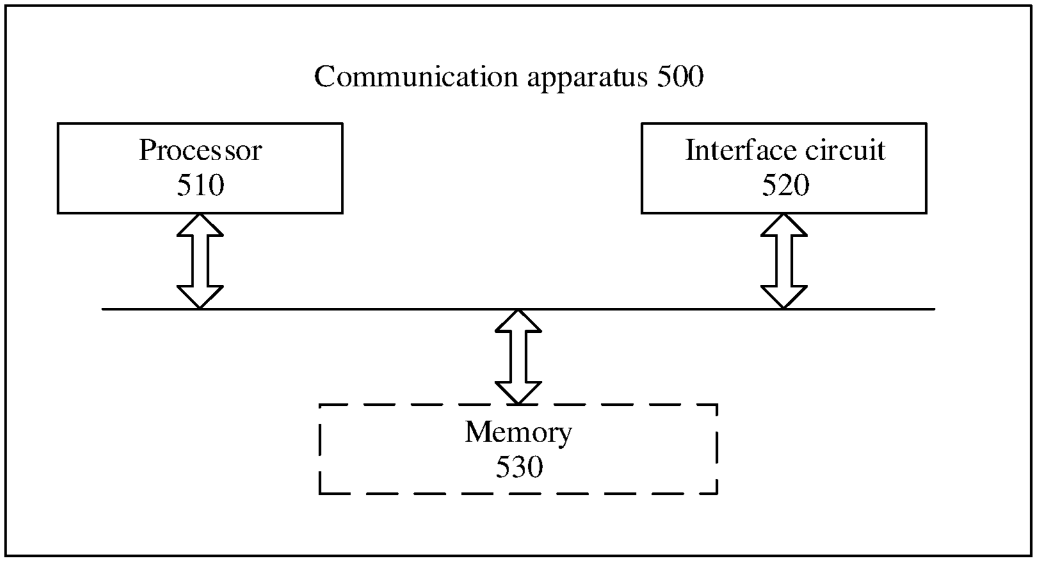
FIG. 5 is a schematic diagram of a structure of another communication apparatus according to an embodiment of this application.

FIG. 4 and FIG. 5 are possible schematic diagrams of structures of communication apparatuses according to embodiments of this application. These apparatuses may be configured to implement the function of the terminal or the base station in the foregoing method embodiment, and therefore can also implement the beneficial effects of the foregoing method embodiment. In embodiments of this application, the apparatus may be the terminals 120*a* to 120*j* shown in FIG. 1, may be the base stations 110*a* and 110*b* shown in FIG. 1, or may be a module (such as a chip) used in a terminal or a base station.

As shown in FIG. 4, the communication apparatus 400 includes a processing unit (or referred to as a processing module) 410 and a transceiver unit (or referred to as a communication module, a communication unit, or a transceiver module) 420. The communication apparatus 400 is configured to implement the function of the terminal or the base station in the method embodiment shown in FIG. 3.

When the communication apparatus 400 is configured to implement the function of the terminal in the method embodiment shown in FIG. 3, the processing unit 410 may be configured to determine the first uplink control channel for carrying the first UCI and the second uplink control channel for carrying the second UCI; and the transceiver unit 420 may be configured to: when the time-frequency resource of the first uplink control channel and the time-frequency resource of the second uplink control channel overlap, send the first UCI and the second UCI over the third uplink control channel by using the first power.

When the communication apparatus 400 is configured to implement the function of the base station in the method embodiment shown in FIG. 3, the processing unit 410 may be configured to determine the first uplink control channel for carrying the first UCI and the second uplink control channel for carrying the second UCI; and the transceiver unit 420 may be configured to: when the time-frequency resource of the first uplink control channel and the time-frequency resource of the second uplink control channel overlap, receive the first UCI and the second UCI from the terminal over the third uplink control channel, where the transmit power of the third uplink control channel is the first power.

For more detailed descriptions of the processing unit 410 and the transceiver unit 420, directly refer to the related descriptions in the method embodiment shown in FIG. 3. Details are not described herein again.

As shown in FIG. 5, the communication apparatus 500 includes a processor 510 and an interface circuit 520. The processor 510 and the interface circuit 520 are coupled to each other. It may be understood that the interface circuit 520 may be a transceiver or an input/output interface. Optionally, the communication apparatus 500 may further include a memory 530, configured to store instructions executed by the processor 510, store input data required by the processor 510 to run instructions, or store data generated by running instructions by the processor 510.

When the communication apparatus 500 is configured to implement the method shown in FIG. 3, the processor 510 is configured to implement the function of the processing unit 410, and the interface circuit 520 is configured to implement the function of the transceiver unit 420.

When the communication apparatus is a chip used in a terminal, the chip of the terminal implements the function of the terminal in the foregoing method embodiment. The chip of the terminal receives information from another module (for example, a radio frequency module or an antenna) in the terminal, where the information is sent by a base station to the terminal. Alternatively, the chip of the terminal sends information to another module (for example, a radio frequency module or an antenna) in the terminal, where the information is sent by the terminal to a base station.

When the communication apparatus is a chip used in a base station, the chip of the base station implements the function of the base station in the foregoing method embodiment. The chip of the base station receives information from another module (for example, a radio frequency module or an antenna) in the base station, where the information is sent by a terminal to the base station. Alternatively, the chip of the base station sends information to another module (for example, a radio frequency module or an antenna) in the base station, where the information is sent by the base station to a terminal.

It may be understood that, the processor in embodiments of this application may be a central processing unit (CPU), or may be another general-purpose processor, a digital signal processor (DSP), an application-specific integrated circuit (ASIC), a field-programmable gate array (FPGA) or another programmable logic device, a transistor logic device, a hardware component, or any combination thereof. The general-purpose processor may be a microprocessor or any regular processor.

The method steps in embodiments of this application may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a base station or a terminal. Certainly, the processor and the storage medium may exist in a base station or terminal as discrete components.

All or some of the foregoing embodiments may be implemented by using software, hardware, firmware, or any combination thereof. When software is used to implement the embodiments, all or some of embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, a base station, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium that can be accessed by a computer, or a data storage device, such as a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid-state drive.

In various embodiments of this application, unless otherwise stated or there is a logical conflict, terms and/or descriptions in different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship between associated objects and indicates that three relationships may exist. For example, A and/or B may indicate the following three cases: Only A exists, both A and B exist, and only B exists. A and B each may be singular or plural. In the text descriptions of this application, the character "/" generally indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. Sequence numbers of the foregoing processes do not mean execution sequences. The execution sequences of the processes should be determined based on functions and internal logic of the processes.

The invention claimed is:

1. An apparatus, comprising:

at least one processor configured to:

determine a first uplink control channel for carrying first uplink control information (UCI) and a second uplink control channel for carrying second UCI; and based on a time domain resource of the first uplink control channel overlapping a time domain resource of the second uplink control channel, send the first UCI and the second UCI over a third uplink control channel by using a first power;

wherein:

the first power is determined based on a quantity of bits of the first UCI and a size of a time-frequency resource for carrying the first UCI via the third uplink control channel and not based on a quantity of bits of the second UCI and a size of a time-frequency resource for carrying the second UCI via the third uplink control channel, wherein a priority of the first UCI is higher than a priority of the second UCI.

2. The apparatus according to claim 1, wherein:

the first power is $P_{PUCCH,b,f,c}(i, q_u, q_d, l)$, $$P_{PUCCH,b,f,c}(i, q_u, q_d, l) = \min\{P_{CMAX,f,c}(i), P_{O\_PUCCH,b,f,c}(q_u) + 10\log_{10}(2^{\mu} M_{RB,b,f,c}^{PUCCH}(i)) + PL_{b,f,c}(q_d) + \Delta_{F\_PUCCH}(F) + \Delta_{TF,b,f,c}(i) + g_{b,f,c}(i)\},$$

$P_{CMAX,f,c}(i)$ indicates maximum power that can be sent by a terminal, and z=min(x,y) indicates that z is equal to a smaller value between x and y, $$P_{O\_PUCCH,b,f,c}(q_u)=P_{O\_NOMINAL\_PUCCH}+P_{O\_UE\_PUCCH}(q_u),$$

$P_{O\_NOMINAL\_PUCCH}$ is a value configured by higher layer signaling p0-nominal, wherein when p0-nominal is not configured, $P_{O\_NOMINAL\_PUCCH}$ is equal to zero, $P_{O\_UE\_PUCCH}(q_u)$ and $PL_{b,f,c}(q_d)$ are determined based on spatial relation information of the third uplink control channel, $$M_{RB,b,f,c}^{PUCCH}(i)$$

is a quantity of resource blocks allocated for the third uplink control channel, μ indicates a subcarrier spacing used by the third uplink control channel; and $\Delta_{F\_PUCCH}(F)$ is a value semi-statically configured by using a higher-layer parameter.

3. The apparatus according to claim 2, wherein the third uplink control channel is physical uplink control channel (PUCCH) Format 2, PUCCH Format 3, or PUCCH Format 4, and wherein $\Delta_{TF,b,f,c}(i)$ is determined based on the quantity of bits of the first UCI and the size of the time-frequency resource for carrying the first UCI via the third uplink control channel.

4. The apparatus according to claim 3, wherein:

$\Delta_{TF,b,f,c}(i)=10\ \log_{10}(K_1\cdot(n_{HARQ\text{-}ACK}(i)+O_{SR}(i)+O_{CSI}(i)/N_{RE}(i)$, wherein $K_1=6$, $n_{HARQ\text{-}ACK}(i)$ indicates a quantity of bits of an acknowledgement/negative acknowledgement (ACK/NACK) in the first UCI, $O_{SR}(i)$ indicates a quantity of bits of a scheduling request (SR) in the first UCI, $O_{CSI}(i)$ indicates a quantity of bits of channel state information (CSI) in the first UCI, and $N_{RE}(i)$ indicates the size of the time-frequency resource for carrying the first UCI via the third uplink control channel.

5. The apparatus according to claim 3, wherein:

$\Delta_{TF,b,f,c}(i)=10\ \log_{10}(2^{K_2\cdot BPRE(i)}-1)$, wherein $K_2=2.4$, $$BPRE(i)=(O_{ACK}(i)+O_{SR}(i)+O_{CSI}(i)+O_{CRC}(i))/N_{RE}(i),$$

$O_{ACK}(i)$ indicates a quantity of bits of an acknowledgement/negative acknowledgement (ACK/NACK) in the first UCI, $O_{SR}(i)$ indicates a quantity of bits of a scheduling request (SR) in the first UCI, $O_{CSI}(i)$ indicates a quantity of bits of channel state information (CSI) in the first UCI, $O_{CRC}(i)$ is a quantity of check bits of the first UCI, and $N_{RE}(i)$ indicates the size of the time-frequency resource for carrying the first UCI via the third uplink control channel.

6. The apparatus according to claim 2, wherein the third uplink control channel is PUCCH Format 1, and wherein $\Delta_{TF,b,f,c}(i)$ is determined based on the quantity of bits of the first UCI and the quantity of bits of the second UCI.

7. The apparatus according to claim 6, wherein:

$$\Delta_{TF,b,f,c}(i) = 10\log_{10}\left(\frac{N_{ref}^{PUCCH}}{N_{symb}^{PUCCH}(i)}\right) + \Delta_{UCI}(i),$$

$$N_{symb}^{PUCCH}(i)$$

indicates a quantity of the symbols occupied by the third uplink control channel, $$N_{ref}^{PUCCH}$$

indicates a quantity of symbols in one slot, and $\Delta_{UCI}(i)=10\log_{10}(O_{UCI}(i))$, wherein $O_{UCI}(i)$ indicates a total quantity of bits of the first UCI and the second UCI.

8. A power control method for an uplink control channel, the method comprising:

determining a first uplink control channel for carrying first uplink control information (UCI) and a second uplink control channel for carrying second UCI; and based on a time domain resource of the first uplink control channel overlapping a time domain resource of the second uplink control channel, receiving the first UCI and the second UCI from a terminal over a third uplink control channel, wherein transmit power of the third uplink control channel is a first power, wherein:

the first power is determined based on a quantity of bits of the first UCI and a size of a time-frequency resource for carrying the first UCI via the third uplink control channel and not based on a quantity of bits of the second UCI and a size of a time-frequency resource for carrying the second UCI via the third uplink control channel, wherein a priority of the first UCI is higher than a priority of the second UCI.

9. The method according to claim 8, wherein:

the first power is $P_{PUCCH,b,f,c}(i, q_u, q_d, l)$, $$P_{PUCCH,b,f,c}(i, q_u, q_d, l) = \min\{P_{CMAX,f,c}(i),\ P_{O\_PUCCH,b,f,c}(q_u) + 10\log_{10}(2^{\mu} M_{RB,b,f,c}^{PUCCH}(i)) + PL_{b,f,c}(q_d) + \Delta_{F\_PUCCH}(F) + \Delta_{TF,b,f,c}(i) + g_{b,f,c}(i)\},$$

$P_{CMAX,f,c}(i)$ indicates maximum power that can be sent by a terminal, and z=min(x,y) indicates that z is equal to a smaller value between x and y, $$P_{O\_PUCCH,b,f,c}(q_u)=P_{O\_NOMINAL\_PUCCH}+P_{O\_UE\_PUCCH}(q_u),$$

$P_{O\_NOMINAL\_PUCCH}$ is a value configured by higher layer signaling p0-nominal, wherein when p0-nominal is not configured, $P_{O\_NOMINAL\_PUCCH}$ is equal to zero, $P_{O\_UE\_PUCCH}(q_u)$ and $PL_{b,f,c}(q_d)$ are determined based on spatial relation information of the third uplink control channel, $$M_{RB,b,f,c}^{PUCCH}(i)$$

is a quantity of resource blocks allocated for the third uplink control channel, μ indicates a subcarrier spacing used by the third uplink control channel; and $\Delta_{F\_PUCCH}(F)$ is a value semi-statically configured by using a higher-layer parameter.

10. The method according to claim 9, wherein the third uplink control channel is physical uplink control channel (PUCCH) Format 2, PUCCH Format 3, or PUCCH Format 4, and wherein $\Delta_{TF,b,f,c}(i)$ is determined based on the quantity of bits of the first UCI and the size of the time-frequency resource for carrying the first UCI via the third uplink control channel.

11. The method according to claim 10, wherein:

$\Delta_{TF,b,f,c}(i)=10\log_{10}(K_1\cdot(n_{HARQ\text{-}ACK}(i)+O_{SR}(i)+O_{CSI}(i)/N_{RE}(i)$, wherein $K_1=6$, $n_{HARQ\text{-}ACK}(i)$ indicates a quantity of bits of an acknowledgement/negative acknowledgement (ACK/NACK) in the first UCI, $O_{SR}(i)$ indicates a quantity of bits of a scheduling request (SR) in the first UCI, $O_{CSI}(i)$ indicates a quantity of bits of channel state information (CSI) in the first UCI, and $N_{RE}(i)$ indicates the size of the time-frequency resource for carrying the first UCI via the third uplink control channel.

12. The method according to claim 10, wherein:

$\Delta_{TF,b,f,c}(i)=10\log_{10}(2^{K_2\cdot BPRE(i)}-1)$, wherein $K_2=2.4$, $$BPRE(i)=(O_{ACK}(i)+O_{SR}(i)+O_{CSI}(i)+O_{CRC}(i))/N_{RE}(i),$$

$O_{ACK}(i)$ indicates a quantity of bits of an acknowledgement/negative acknowledgement (ACK/NACK) in the first UCI, $O_{SR}(i)$ indicates a quantity of bits of a scheduling request (SR) in the first UCI, $O_{CSI}(i)$ indicates a quantity of bits of channel state information (CSI) in the first UCI, $O_{CRC}(i)$ is a quantity of check bits of the first UCI, and $N_{RE}(i)$ indicates the size of the time-frequency resource for carrying the first UCI via the third uplink control channel.

13. The method according to claim 9, wherein the third uplink control channel is physical uplink control channel (PUCCH) Format 1, and wherein $\Delta_{TF,b,f,c}(i)$ is determined based on the quantity of bits of the first UCI and the quantity of bits of the second UCI.

14. The method according to claim 13, wherein:

$$\Delta_{TF,b,f,c}(i) = 10\log_{10}\left(\frac{N_{ref}^{PUCCH}}{N_{symb}^{PUCCH}(i)}\right) + \Delta_{UCI}(i),$$

$$N_{symb}^{PUCCH}(i)$$

indicates a quantity of the symbols occupied by the third uplink control channel, $$N_{ref}^{PUCCH}$$

indicates a quantity of symbols in one slot, and $\Delta_{UCI}(i)=10\log_{10}(O_{UCI}(i))$, wherein $O_{UCI}(i)$ indicates a total quantity of bits of the first UCI and the second UCI.

15. An apparatus, comprising:

at least one processor configured to:

determine a first uplink control channel for carrying first uplink control information (UCI) and a second uplink control channel for carrying second UCI; and based on a time domain resource of the first uplink control channel overlapping a time domain resource of the second uplink control channel, receive the first UCI and the second UCI from a terminal over a third uplink control channel, wherein transmit power of the third uplink control channel is a first power, wherein:

the first power is determined based on a quantity of bits of the first UCI and a size of a time-frequency resource for carrying the first UCI via the third uplink control channel and not based on a quantity of bits of the second UCI and a size of a time-frequency resource for carrying the second UCI via the third uplink control channel, wherein a priority of the first UCI is higher than a priority of the second UCI.

16. The apparatus according to claim 15, wherein:

the first power is $P_{PUCCH,b,f,c}(i, q_u, q_d, l)$, $$P_{PUCCH,b,f,c}(i, q_u, q_d, l) = \min\{P_{CMAX,f,c}(i),\ P_{O\_PUCCH,b,f,c}(q_u) + 10\log_{10}(2^{\mu} M_{RB,b,f,c}^{PUCCH}(i)) + PL_{b,f,c}(q_d) + \Delta_{F\_PUCCH}(F) + \Delta_{TF,b,f,c}(i) + g_{b,f,c}(i)\},$$

$P_{CMAX,f,c}(i)$ indicates maximum power that can be sent by a terminal, and z=min(x,y) indicates that z is equal to a smaller value between x and y, $$P_{O\_PUCCH,b,f,c}(q_u)=P_{O\_NOMINAL\_PUCCH}+P_{O\_UE\_PUCCH}(q_u),$$

$P_{O\_NOMINAL\_PUCCH}$ is a value configured by higher layer signaling p0-nominal, wherein when p0-nominal is not configured, $P_{O\_NOMINAL\_PUCCH}$ is equal to zero, $P_{O\_UE\_PUCCH}(q_u)$ and $PL_{b,f,c}(q_d)$ are determined based on spatial relation information of the third uplink control channel, $$M_{RB,b,f,c}^{PUCCH}(i)$$

is a quantity of resource blocks allocated for the third uplink control channel, μ indicates a subcarrier spacing used by the third uplink control channel; and $\Delta_{F\_PUCCH}(F)$ is a value semi-statically configured by using a higher-layer parameter.

17. The apparatus according to claim 16, wherein the third uplink control channel is physical uplink control channel (PUCCH) Format 2, PUCCH Format 3, or PUCCH Format 4, and wherein $\Delta_{TF,b,f,c}(i)$ is determined based on the quantity of bits of the first UCI and the size of the time-frequency resource for carrying the first UCI via the third uplink control channel.

18. The apparatus according to claim 17, wherein:

$\Delta_{TF,b,f,c}(i)=10\log_{10}(K_1\cdot(N_{HARQ\text{-}ACK}(i)+O_{SR}(i)+O_{CSI}(i))/N_{RE}(i))$, wherein $K_1=6$, $n_{HARQ\text{-}ACK}(i)$ indicates a quantity of bits of an acknowledgement/negative acknowledgement (ACK/NACK) in the first UCI, $O_{SR}(i)$ indicates a quantity of bits of a scheduling request (SR) in the first UCI, $O_{CSI}(i)$ indicates a quantity of bits of channel state information (CSI) in the first UCI, and $N_{RE}(i)$ indicates the size of the time-frequency resource for carrying the first UCI via the third uplink control channel.

19. The apparatus according to claim 17, wherein:

$\Delta_{TF,b,f,c}(i)=10\log_{10}(2^{K_2\cdot BPRE(i)}-1)$, wherein $K_2=2.4$, $$BPRE(i)=(O_{ACK}(i)+O_{SR}(i)+O_{CSI}(i)+O_{CRC}(i))/N_{RE}(i),$$

$O_{ACK}(i)$ indicates a quantity of bits of an acknowledgement/negative acknowledgement (ACK/NACK) in the first UCI, $O_{SR}(i)$ indicates a quantity of bits of a scheduling request (SR) in the first UCI, $O_{CSI}(i)$ indicates a quantity of bits of channel state information (CSI) in the first UCI, $O_{CRC}(i)$ is a quantity of check bits of the first UCI, and $N_{RE}(i)$ indicates the size of the time-frequency resource for carrying the first UCI via the third uplink control channel.

20. The apparatus according to claim 16, wherein the third uplink control channel is physical uplink control channel (PUCCH) Format 1, and wherein a $\Delta_{TF,b,f,c}(i)$ is determined based on the quantity of bits of the first UCI and the quantity of bits of the second UCI.

* * * * *